(12) United States Patent
Wu

(10) Patent No.: US 8,171,342 B2
(45) Date of Patent: May 1, 2012

(54) DEVICE AND METHOD FOR OUTPUTTING BIOS POST CODE

(75) Inventor: Diablo Wu, Sichuan (CN)

(73) Assignee: Micro-Star Int'l Co., Ltd., Jung-He (TW)

( * ) Notice: Subject to any disclaimer, the term of this patent is extended or adjusted under 35 U.S.C. 154(b) by 310 days.

(21) Appl. No.: 12/418,626

(22) Filed: Apr. 6, 2009

(65) Prior Publication Data

US 2010/0107011 A1    Apr. 29, 2010

(30) Foreign Application Priority Data

Oct. 23, 2008    (TW) ................................ 97140744 A

(51) Int. Cl.
*G06F 11/00*    (2006.01)

(52) U.S. Cl. .............. 714/36; 713/100; 714/25; 714/30; 714/703; 714/733; 710/300; 710/303; 710/304

(58) Field of Classification Search ..................... 714/25, 714/30, 703, 733; 713/100; 710/301, 304, 710/305, 306
See application file for complete search history.

(56) References Cited

U.S. PATENT DOCUMENTS

| | | | | |
|---|---|---|---|---|
| 5,600,766 A * | 2/1997 | Deckys et al. | ................ | 345/641 |
| 5,996,072 A * | 11/1999 | Noll et al. | ................ | 713/1 |
| 2002/0121913 A1 * | 9/2002 | Miller et al. | ................ | 324/760 |
| 2003/0093607 A1 * | 5/2003 | Main et al. | ................ | 710/306 |
| 2003/0163765 A1 * | 8/2003 | Eckardt et al. | ................ | 714/36 |
| 2004/0010773 A1 * | 1/2004 | Chan et al. | ................ | 717/104 |
| 2005/0132177 A1 * | 6/2005 | Challener et al. | ................ | 713/1 |
| 2005/0202846 A1 * | 9/2005 | Glass et al. | ................ | 455/557 |
| 2007/0168737 A1 * | 7/2007 | Lee et al. | ................ | 714/36 |
| 2008/0133961 A1 * | 6/2008 | Kao et al. | ................ | 714/3 |
| 2008/0294939 A1 * | 11/2008 | Kong | ................ | 714/37 |
| 2009/0007158 A1 * | 1/2009 | Azmi et al. | ................ | 719/328 |

OTHER PUBLICATIONS

Intel, "Intel Low Pin count", Aug. 2002, Intel, Rev. 1.1, p. 1-54.*
Lattice, "LPC Bus Controller", Apr. 2011 (imitial release Feb. 2009), p. 1-8.*

* cited by examiner

*Primary Examiner* — Robert Beausoliel, Jr.
*Assistant Examiner* — Jeison C Arcos
(74) *Attorney, Agent, or Firm* — Ditthavong Mori & Steiner, P.C.

(57) ABSTRACT

A device and method for outputting BIOS POST code, applied to a computer system. The device includes a basic input output system (BIOS), a transfer module and a video graphics array (VGA) connector. The BIOS generates a power-on self-test (POST) code using a low pin count (LPC) interface format. The transfer module receives the POST code and transfers the format of the POST code to a system management bus (SMBus) format. The VGA connector receives and outputs the POST code transmitted from the transfer module.

5 Claims, 5 Drawing Sheets

DEVICE AND METHOD FOR OUTPUTTING BIOS POST CODE

CROSS-REFERENCES TO RELATED APPLICATIONS

This non-provisional application claims priority under 35 U.S.C. §119(a) on Patent Application No(s). 97140744 filed in Taiwan, R.O.C. on 2008 Oct. 23, the entire contents of which are hereby incorporated by reference.

FIELD OF THE INVENTION

The present invention relates to a device and method for outputting a POST code, and more particularly to a device and method for output a BIOS POST code.

BACKGROUND

The basic input output system (BIOS) of computer systems (e.g. notebook computer, desktop computer, and etc), carry out a power-on self-test (POST) of hardware during power-on or power reset. The POST is a test action carried out to test in advance whether each component is functioning normally or whether specific devices are not assembled properly before an operation system is read, ensuring a computer operates normally. A so-called POST code will be generated if an abnormal situation in the computer system arises after the POST is carried out. This identifies which part of the hardware is out of order, enabling its restoration in accordance with the POST code.

Conventionally, the POST code is transmitted to a PCI bus through a master system chip, and then decoded and displayed by a facility connected to the PCI bus. At present, the POST code is typically transmitted to a low pin count (LPC) interface bus through the master system chip, and then received and displayed by an external detector.

A connector on the motherboard of the computer system must be reserved so as to allow the detector to be connected thereto and receive the POST code when the POST code is transmitted via an LPC interface. A space of at least seven, and up to nine pins must be occupied, since the LPC interface has at least seven signal lines (nine signal lines if ground (GND) signal lines are included). However, contemporary computer systems (e.g. notebook computer), have a tendency toward lightness and thinness, resulting in internal space being at a premium. Therefore, the connector reserved by the conventional LPC interface occupies too much space on the motherboard.

Furthermore, in order to connect the detector onto the connector of the LPC interface of the motherboard to receive and display the POST code, the conventional technology requires the housing of a computer to be detached so that the previously mentioned connection can then be made. This creates inconvenience, and increases the difficulty of operation.

For this reason, the conventional technology proposes a method of using a USB port to transmit the POST code. However, a USB interface must be used with the initialization of a computer system, and can then operate normally. This means that the USB interface will not work normally before the computer system initializes a USB facility; but the POST code cannot be transmitted if the computer system is non-functional at this time.

The conventional technology also proposes a method of using LEDs positioned on a notebook computer system to display a POST code, for example, a combination of LEDs such as keyboard lights, power source lights, hardware lights, etc, built in the notebook computer to display a corresponding POST code. However, a user must first know the POST codes represented by the changes of the LED lights in accordance with this method, so that the user must be trained in advance or a corresponding table must be examined repeatedly. This increases the time involved in computer startup.

SUMMARY OF THE INVENTION

To solve the problem of outputting BIOS POST code in a computer system, the present invention proposes a device and method for outputting a BIOS POST code. It does not need to occupy too many pins as the LPC interface in the conventional technology does, in accordance with the device or method proposed by the present invention, such that the space in a computer system can be saved. In addition, the housing of the computer system does not need to be detached, making inspection and error detection substantially more convenient.

The present invention proposes a BIOS POST code outputting device, applied to a computer system. The device includes a basic input output system (BIOS), a transfer module and a video graphics array (VGA) connector. The BIOS generates a power-on self-test (POST) code using a low pin count (LPC) interface format. The transfer module receives the POST code and transfers the format of the POST code to a system management bus (SMBus) format. The VGA connector receives and outputs the POST code transmitted from the transfer module.

The present invention also proposes a BIOS POST code outputting device, applied to a computer system. The device includes a basic input output system (BIOS), a transfer module and a system management bus (SMBus) connector. The BIOS generates a power-on self-test (POST) code using a low pin count (LPC) interface format. The transfer module receives the POST code and transfers the format of the POST code to a system management bus (SMBus) format. The SMBus connector receives and outputs the POST code transmitted from the transfer module.

The present invention also proposes a method for outputting a BIOS POST code, including the follow steps: generating a POST code using an LPC format by means of the BIOS; transferring the format of the POST code to SMBus format; and outputting the POST code in SMBus format.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
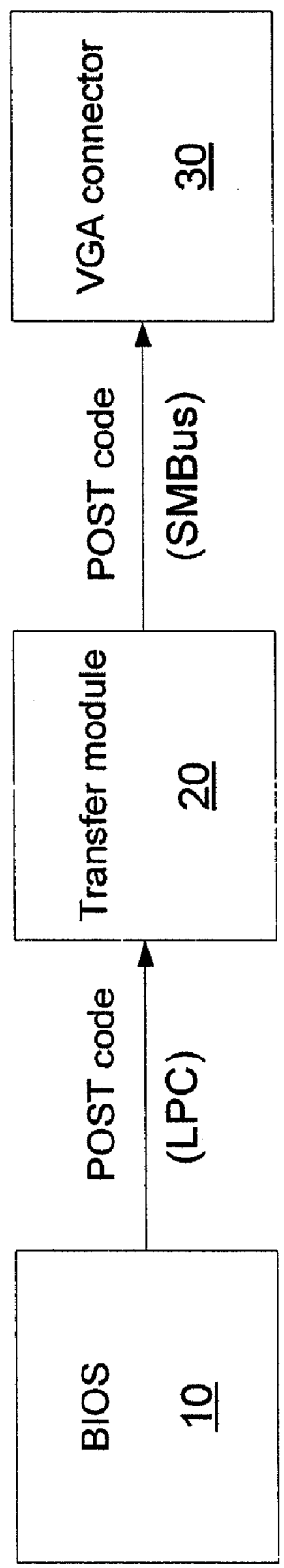
FIG. 1 is a block diagram, showing a BIOS POST code outputting device of a first embodiment according to the present invention.

Please refer to FIG. 1. FIG. 1 is a block diagram, showing a BIOS POST code outputting device of a first embodiment according to the present invention. The BIOS POST code outputting device proposed by the present invention is applied to a computer system, and includes a basic input output system (BIOS) 10, a transfer module 20 and a video graphics array (VGA) connector 30.

The BIOS 10 in the computer system carries out detection and initialization of computer hardware, and outputs a power-on self-test (POST) code in accordance with the running of a detection program at every step. Next, The BIOS sends the POST code to a specific system bus or interface in accordance with the condition of the hardware of the computer system, to allow detection personnel to obtain the POST code through the system bus or interface.

Therefore, the BIOS 10 proposed by the present invention is used for generating the POST code using a low pin count (LPC) interface format. The POST code may be transmitted by an LPC interface because the POST code generated by the BIOS 10 is LPC interface format.

The transfer module 20 transfers the POST code form the original LPC interface format to a system management bus (SMBus) format after receiving the POST code transmitted from the BIOS 10, where the transfer module 20 may be a keyboard controller (KBC) functioning as part of a general computer system. The KBC has many functions, such as controlling a keyboard, controlling the brightness of a screen, and controlling a touch pad and also has the function of transferring the LPC interface format to the SMBus format. Therefore, the present invention may use the KBC as the transfer module 20, transferring the POST code from the LPC interface format to the SMBus format. Other elements do not need to be added, and the overall expense is not increased because the KBC is already part of the computer system.

The VGA connector 30 is used for receiving and outputting the POST code transmitted from the transfer module 20. The SMBus format can reduce substantially the physical space taken up by the computer system in comparison to the LPC interface (for which at least seven and up to nine pins must be reserved), because the transfer module 20 has already transferred the POST code to the SMBus format and only two to three pins are required (two pins if a ground signal pin is not reserved, and three pins if the ground signal pin is reserved).

Furthermore, the transfer module 20 transmits the POST code to at least two idle pins in the VGA connector 30. The fourth pin and the eleventh pin in a general VGA connector 30 are reserved pins, i.e. idle pins. Accordingly, the present invention transmits the POST code transferred to the SMBus format to the two originally reserved idle pins of the VGA connector 30, where one idle pin is used for receiving a data signal of the POST code and another is used for receiving a clock signal of the POST code.

The aforementioned VGA connector 30 is a connector installed in a general computer system. The VGA connector 30 is used to receive and output the POST code such that an extra connector and extra circuit are both unnecessary, saving valuable space in the computer system. Moreover, an external device only needs to be connected to the VGA connector 30, and can then read the POST code because the VGA connector 30 receives and outputs the POST code. It is therefore unnecessary to detach the computer system housing as the conventional technology requires, thus increasing the convenience of the operation.

Figure 2:
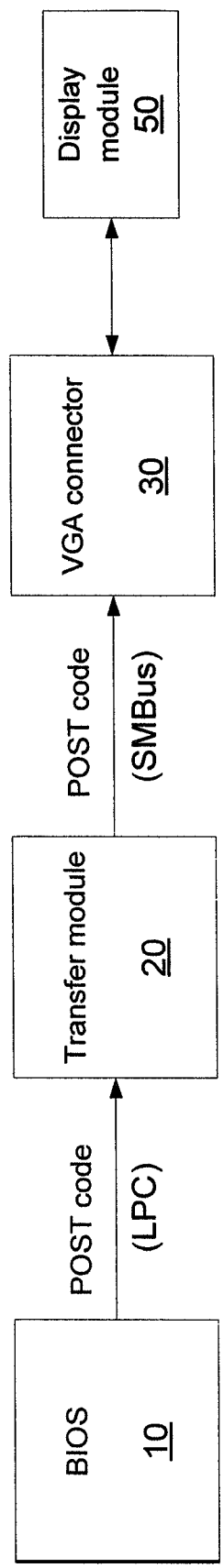
FIG. 2 is a block diagram, showing a BIOS POST code outputting device of a second embodiment according to the present invention.

Please refer to FIG. 2. FIG. 2 is a block diagram, showing a BIOS POST code outputting device of a second embodiment according to the present invention. The second embodiment further includes a display module 50, where the display module 50 is used to connect to a VGA connector 30 and display the POST code. When the detection personnel want to read the POST code in order to determine the condition of the computer system hardware, they need only connect the display module 50 to the VGA connector 30, and the POST code can then displayed. The display module 50 must support the SMBus format, and is connected to the BGA connector 30 so that the detection personnel can then read the POST code through the display module 50, as the POST code output from the VGA connector 30 connected thereto is in the SMBus format.

Figure 3:
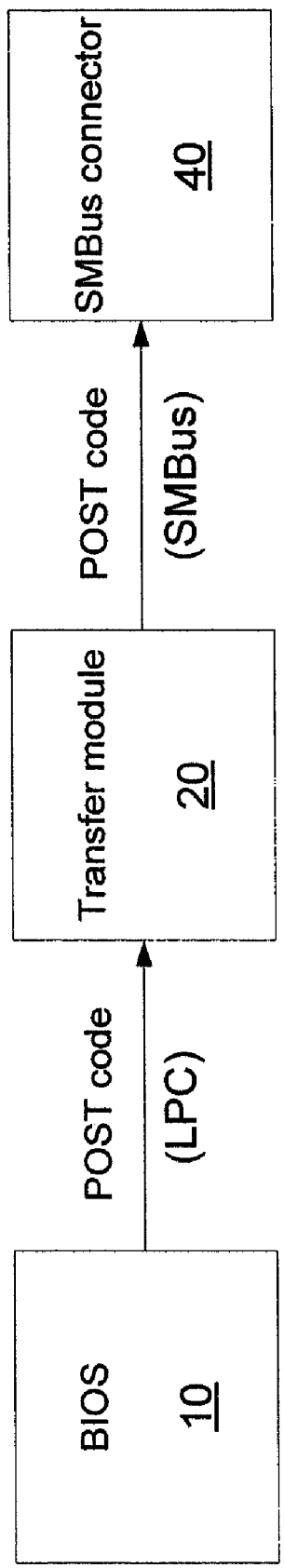
FIG. 3 is a block diagram, showing a BIOS POST code outputting device of a third embodiment according to the present invention.

Please refer to FIG. 3. FIG. 3 is a block diagram, showing a BIOS POST code outputting device of a third embodiment according to the present invention. The third embodiment is similar to the first embodiment, and a difference between them is in that an extra reserved SMBus 40 is adopted in the third embodiment, and it receives and outputs the POST code transmitted from the transfer module 20. In this case it only needs to reserve a space with two to three pins in the computer system. In comparison with the manner of reserving the LPC interface in the conventional technology, the device proposed by the present invention uses two to three fewer signal lines. Thus physical space in the computer system can be saved, and the installment position of the connector is more flexible.

Figure 4:
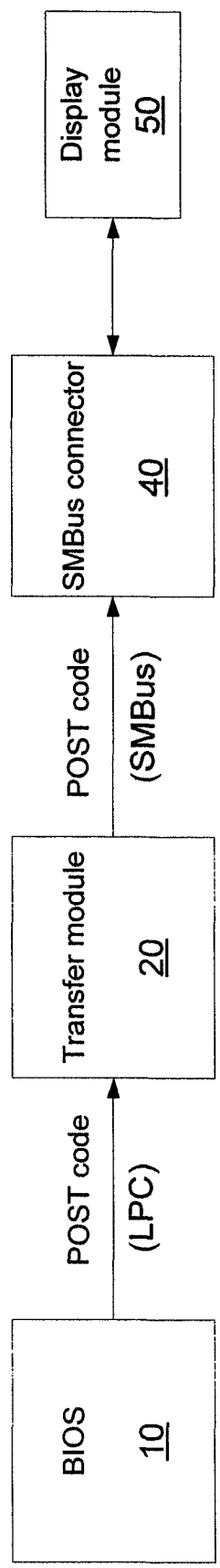
FIG. 4 is a block diagram, showing a BIOS POST code outputting device of a fourth embodiment according to the present invention.

Similarly, the third embodiment may also include a display module 50 as FIG. 4 shows. The display module 50 is connected to the SMBus connector 40 and displays the POST code. Detection personnel are therefore able to read the POST code easily by connecting the display module 50 to the SMBus connector 40 in order to determine the condition of the computer system hardware, where the computer system may be a notebook computer or a desktop computer.

Figure 5:
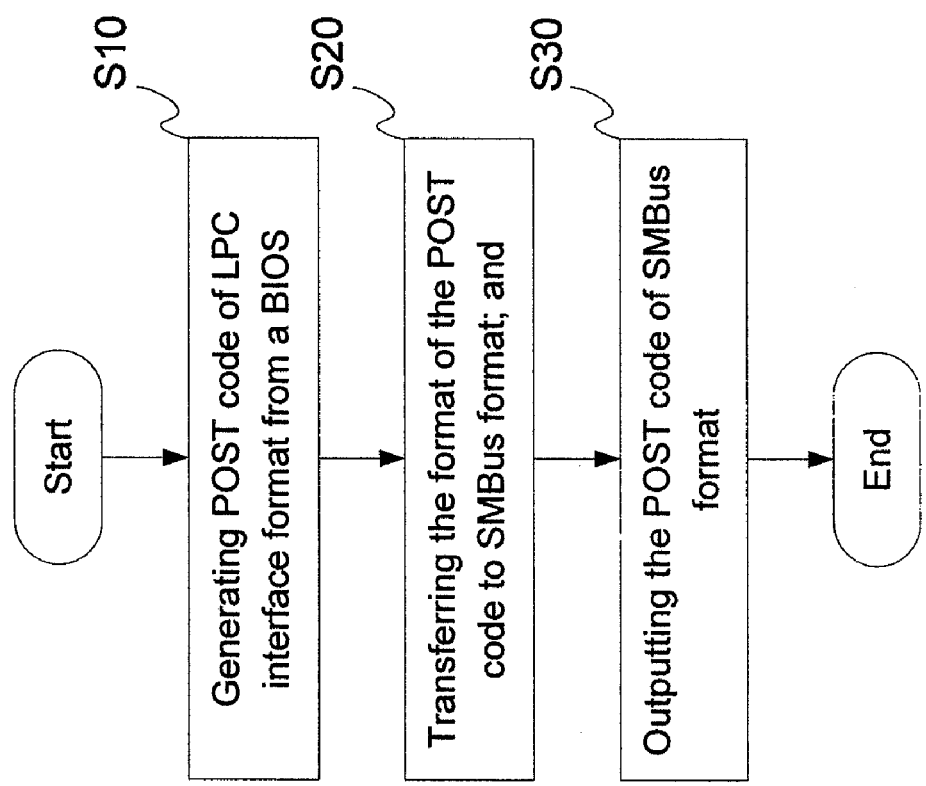
FIG. 5 is a flow chart, showing a method for outputting BIOS POST code according to the present invention.

Please refer to FIG. 5. FIG. 5 is a flow chart, showing a method for outputting BIOS POST code according to the present invention. The method includes the following steps:

Step S10: generating a POST code of an LPC interface format from a BIOS;

Step S20: transferring the format of the POST code to SMBus format; and

Step S30: outputting the POST code in SMBus format, where step S30 may further include the following step: providing a VGA connector used for receiving and outputting the POST code. Furthermore, in order to enable detection personnel to read the POST code easily, a display module may be connected to the VGA connector, displaying the POST code. Detection personnel may read the POST code using the display module.

Another way may provide an extra reserved SMBus connector used for receiving and outputting the POST code. Similarly, it may provide a display module connected to the SMBus connector and displaying the POST code; it also allows detection personnel to read the POST code through the display module.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A BIOS POST code outputting device, applied to a computer system, the device comprising:
   a basic input output system (BIOS), generating a POST code using a low pin count (LPC) interface format;
   a transfer module, receiving the POST code, transferring the format of the POST code to a system management bus (SMBus) format; and a video graphic array (VGA) connector, receiving and outputting the POST code transmitted from the transfer module, wherein the transfer module transmits the POST code to at least two idle pins of the VGA connector, one of the idle pins receives a data signal of the POST code while another one of the idle pins receives a clock signal of the POST code, and the idle pins are respectively at least a fourth pin and an eleventh pin in the VGA connector.

2. The BIOS POST code outputting device according to claim 1, wherein the transfer module is a keyboard controller (KBC).

3. The BIOS POST code outputting device according to claim 1, wherein the computer system is a notebook computer.

4. The BIOS POST code outputting device according to claim 1, wherein the computer system is a desktop computer.

5. The BIOS POST code outputting device according to claim 1, further comprising a display module used for connecting the VGA connector and displaying the POST code.

* * * * *

UNITED STATES PATENT AND TRADEMARK OFFICE
CERTIFICATE OF CORRECTION

PATENT NO.          : 8,171,342 B2
APPLICATION NO.     : 12/418626
DATED               : May 1, 2012
INVENTOR(S)         : Diablo Wu It is certified that error appears in the above-identified patent and that said Letters Patent is hereby corrected as shown below:

Title Page, item (73);
Assignee: "Micro-Star Int'l Co., Ltd., Jung-He (TW)" should read --Micro-Star Int'l Co., Ltd., Jung-He (TW); MSI Electronics (Kun Shan) Co., Ltd., Kunshan City (CN)--.

Signed and Sealed this
Eighteenth Day of September, 2012

David J. Kappos
*Director of the United States Patent and Trademark Office*